Oct. 13, 1936.      A. ROSCH      2,057,596
HYDRAULIC REGULATING MECHANISM
Filed May 23, 1935
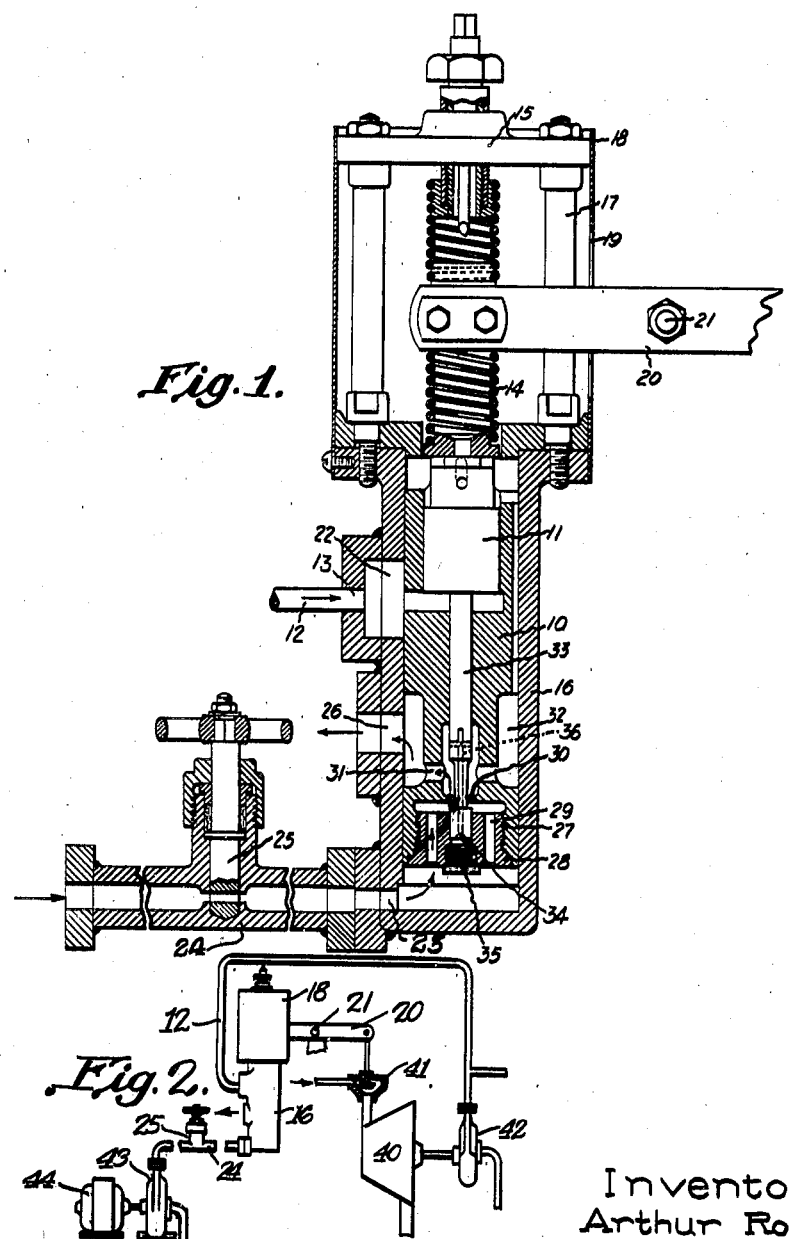
Inventor:
Arthur Rosch,
by Harry E. Dunham
His Attorney Patented Oct. 13, 1936

2,057,596

UNITED STATES PATENT OFFICE 2,057,596

HYDRAULIC REGULATING MECHANISM

Arthur Rosch, Brieselang/Sud, Germany, assignor to General Electric Company, a corporation of New York Application May 23, 1935, Serial No. 23,041
In Germany July 23, 1934

5 Claims. (Cl. 121—43)

The present invention relates to hydraulic regulating mechanisms, such as may be used for controlling the flow of actuating fluid to a prime mover in response to changes in speed or like operating condition of the prime mover or the like.

The usual speed responsive governing mechanism of this type includes a positive displacement pump driven by the prime mover and connected to a pressure responsive device or hydraulic cylinder to effect expansion of the pressure responsive device or movement of an element such as a piston in the hydraulic cylinder in response to speed changes. The pressure responsive device includes an element which may be in the form of a piston connected to an element to be controlled, such as an admission valve of an elastic fluid turbine. The ordinary type of these governing mechanisms has considerable time lag, that is, a considerable period of time elapses between a change in operating condition, such as a change in speed, and the response or final adjustment of the element to be controlled in accordance with the changed operating condition. This time lag is due to the fact that the ordinary type of regulating mechanism responding to a change in pressure also necessitates a change in flow, that is, to effect movement of the pressure responsive device it is necessary to change the pressure to which such device is subjected and it is necessary also to change the flow of fluid to or from such device, in other words, to effect a displacement of fluid in the pressure responsive device.

The object of my invention is to provide an improved construction and arrangement of hydraulic regulating mechanisms in which movement of an element to be controlled is effected by means including a pressure responsive device at a minimum displacement of fluid, whereby the time lag between a change in operating conditions and a corresponding setting or positioning of an element to be controlled may be reduced to a minimum.

For a brief explanation of my invention, let us assume we have a pressure responsive device in the form of a hydraulic cylinder including a piston with one side biased in one direction by a spring or the like and with the other side subject to pressure of oil or like actuating fluid. In the ordinary arrangement a change in oil pressure causes movement of the piston relative to the cylinder. This, however, necessitates displacement of oil in the cylinder, that is, discharge of oil from or supply of oil to the cylinder. In accordance with my invention the cylinder or at least the bottom thereof is movably arranged and auxiliary means are provided to effect movement of the cylinder or its bottom in response to and in the direction of movement of the piston. This means includes a pilot valve connected to the piston for causing movement of the cylinder after the initiation of movement of the piston. With such arrangement the volume of the space defined between the cylinder and the piston may be maintained substantially constant and the time lag of the mechanism may be considerably reduced thereby.

For a better understanding of what I believe to be novel and my invention, attention is directed to the following description and the claims appended thereto in connection with the accompanying drawing.

In the drawing, Fig. 1 represents somewhat diagrammatically a sectional view of a hydraulical governing mechanism embodying my invention and Fig. 2 represents an elastic fluid turbine arrangement with the hydraulic control mechanism shown in Fig. 1.

The arrangement comprises a cylinder 10 with a piston 11 movably disposed therein. Oil or like actuating fluid varying in pressure in response to changes in a certain operating condition is supplied to the cylinder by a conduit 12 connected to a port 13. The piston is biased in downward direction by means including a spring 14 held between the piston and a fixed support 15. The arrangement so far described is typical of any hydraulic governing mechanism. During operation a change in oil pressure, for instance, an increase in oil pressure, causes upward movement of the piston 11 against the biasing force of the spring 14, the cylinder 10 remaining stationary. This, as pointed out above, necessitates an increase in flow of actuating fluid to the cylinder, resulting in considerable time lag of the mechanism. This drawback is overcome in accordance with my invention by the provision of means for moving the cylinder in response to movement and in the same direction of movement of the piston 11. In the present example the cylinder 10 is disposed within a cylindrical casing 16. Broadly, the cylinder 10 represents a cylindrical member which together with the piston member is movably disposed in the casing 16 to define a space for receiving oil or like actuating fluid. The upper end of the casing is flanged and secured to the aforementioned fixed support 15 by means of bolts 17. The space defined between the fixed support 15 and the upper end of the casing 16 is enclosed by a sheet mantle 18 having an opening 19. A lever 20 projects through the opening 19 and is secured at its left-hand end to the spring 14. An intermediate point of the lever 20 is held on a pivot 21 and the right-hand end of the lever 20, broken away in the drawing, may be connected in any desirable manner to an element to be controlled.

The casing 16 has an opening 22 connecting the port 13 with the cylinder 10. The lower end of the casing has an inlet port 23 connected to a conduit 24 including a valve 25. An intermediate portion of the casing 16 has a discharge port 26. Communication between the inlet port 23 and the discharge port 26 is established through channels defined within the lower end of the cylinder 10. This lower end has a large threaded recess 27 accommodating a plug 28. The latter has bores 29 for conducting fluid from the space below the plug through a reduced opening 30 within the cylinder 10, whence the fluid is discharged through lateral openings 31 and a recess 32 formed in the outer surface of the cylinder 10 to the port 26.

The flow of fluid through the reduced opening 30 is controlled by a valve which may be termed a pilot valve in response to movement of the piston 11. The pilot valve includes a stem 33 secured to the piston 11, and slidably disposed in a central bore of the cylinder 10. A valve member 34 is fastened to the lower reduced end of the stem 33 and slidably disposed in a central bore of the plug 28. The lower end of the central bore in the plug 28 is closed by a small plug 35. The lower end of the stem 33 has a central bore 36 establishing communication between the space defined between the upper end of the small plug 35 and the adjacent face of the valve member 34 and the outlet 26. The purpose of the central bore 36 is to prevent the creation of a vacuum or a pressure intermediate the small plug 35 and the lower end of the valve member 34 which would interfere with the free movement of the pilot valve.

The conduit 24 may be connected to any suitable source, preferably a source of constant pressure which may be adjusted by the valve 25. The pilot valve controls the flow of fluid from the inlet port 23 through the aforementioned channels to the outlet port 26. The flow of fluid in turn determines the static pressure set up below the lower end of the cylinder 10. As the pilot valve is moved upward, the flow through the rstricted opening 30 is reduced. This causes increase in static pressure below the cylinder 10, effecting upward movement thereof.

Fig. 2 shows the arrangement of Fig. 1 in combination with an elastic fluid turbine. The arrangement comprises an elastic fluid turbine 40 with an inlet valve 41 connected to the right-hand end of the lever 20. The inlet conduit 12 of the hydraulic control mechanism is connected to a positive displacement pump 42 driven from the turbine shaft and the conduit 24 is connected to a source of fluid pressure, in the present instance a pump 43 driven by a constant speed motor 44.

Let us assume the mechanism as shown is in operating condition with the conduit 12 connected to a positive displacement pump driven by a prime mover and the conduit 24 connected to a source of substantially constant pressure as shown in Fig. 2. If now the pressure in the conduit 12 increases, owing to an increased speed of the prime mover and a consequent increased discharge pressure of the positive displacement pump, the piston 11 is moved upward. The initial upward movement causes a similar movement of the pilot valve, which latter thereby reduces the flow of fluid through the rstricted opening 30 and hence causes an increase in pressure below the lower end of the cylinder 10, resulting in upward movement of the latter. The mechanism may be adjusted so that the magnitude of the upward movement of the cylinder 10 is equal to that of the piston 11, whereby the volume of the space between the two remains constant. In this case the arrangement depends substantially solely on pressure changes and is substantially independent of displacement of fluid between the cylinder 10 and the piston 11. This obviously permits of a more rapid response of the lever 20 and the element to be controlled to changes in operating condition.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A hydraulic regulating mechanism including a cylinder, a piston for connection to a machine element to be controlled being movably disposed in the cylinder, means for conducting actuating fluid to the cylinder to effect movement of the piston, and auxiliary means for moving the cylinder in response to movement of the piston to reduce the amount of actuating fluid to be displaced in the cylinder whereby the time lag of the mechanism is reduced.

2. A hydraulic regulating mechanism including a cylinder, a piston movably disposed in the cylinder, means for conducting actuating fluid to the cylinder, means for moving the cylinder in response to movement of the piston comprising a casing enclosing the cylinder, means for conducting fluid under pressure to the lower end of the casing, means including a channel in the lower end of the cylinder for discharging fluid from the lower end of the casing and a pilot valve connected to the piston for controlling the flow of fluid through said channel.

3. A hydraulic regulating mechanism including a casing, a piston for connection to a machine element to be controlled and a cylindrical member movably disposed in the casing and defining a space between them, the piston and the cylindrical member defining a hydraulic motor, means for conducting actuating fluid to said space to effect movement of the piston, and other means for moving the cylindrical member in response to movement of the piston to maintain the volume of said space substantially constant and thereby to reduce the time lag of the mechanism, said other means including fluid under pressure biasing the cylindrical member towards the piston and valve means positioned by the piston for controlling the fluid pressure.

4. A hydraulic control mechanism including a hydraulic motor having a piston for connection to an element to be controlled and a cylinder for the piston, means for conducting actuating fluid to the cylinder in response to changes in operating condition of a machine to be controlled to effect movement of the piston, and means for moving the cylinder in response to and in the direction of movement of the piston comprising a casing, means for conducting fluid under pressure to the casing to bias the cylinder towards the piston and means for varying said biasing force in response to movement of the piston to maintain substantially constant the relative position between the piston and the cylinder and thereby to reduce the time lag of the mechanism.

5. A hydraulic regulating mechanism for controlling an engine including a hydraulic motor having a movable cylinder and a piston with a stem for connection to an engine element to be controlled, said piston being movably disposed in the cylinder and defining a space therewith for receiving fluid under pressure variable in response to an operating condition of the engine to be controlled, and means for maintaining substantially constant the volume of said space comprising a casing in which said cylinder is movably disposed, means for conducting fluid at a fixed pressure to said casing to bias said cylinder against said piston, a channel through which fluid is discharged from said casing and a valve for controlling the discharge of fluid in reponse to movement of the piston.

ARTHUR ROSCH.